US007288223B2

(12) United States Patent
Becker et al.

(10) Patent No.: US 7,288,223 B2
(45) Date of Patent: Oct. 30, 2007

(54) METHOD AND APPARATUS FOR PRODUCING A RESPIRATORY FILTER

(75) Inventors: Frank Becker, Berlin (DE); Martin Kurth, Berlin (DE); Thomas Krügerke, Berlin (DE)

(73) Assignee: Auergesellschaft GmbH, Berlin (DE)

( * ) Notice: Subject to any disclaimer, the term of this patent is extended or adjusted under 35 U.S.C. 154(b) by 969 days.

(21) Appl. No.: 09/837,499

(22) Filed: Apr. 18, 2001

(65) Prior Publication Data

US 2002/0000229 A1 Jan. 3, 2002

(30) Foreign Application Priority Data

Apr. 27, 2000 (DE) ................................ 100 21 582

(51) Int. Cl.
*A62B 7/10* (2006.01)
*B01D 53/02* (2006.01)
*B29C 43/18* (2006.01)

(52) U.S. Cl. ...................... 264/267; 264/274; 264/275; 264/DIG. 48; 128/205.27; 96/147; 96/154

(58) Field of Classification Search ................ 264/274, 264/275, 279, 267, DIG. 48; 425/127
See application file for complete search history.

(56) References Cited

U.S. PATENT DOCUMENTS 4,490,321 A * 12/1984 Klinkau ..................... 264/109
4,790,306 A * 12/1988 Braun et al. ........... 128/206.12
5,817,263 A * 10/1998 Taylor ......................... 264/113
6,277,178 B1 * 8/2001 Holmquist-Brown et al. . 96/135
6,776,944 B2 * 8/2004 Kelman et al. ............. 264/138

* cited by examiner

*Primary Examiner*—Edmund H. Lee
(74) *Attorney, Agent, or Firm*—Wood, Phillips, Katz, Clark & Mortimer

(57) ABSTRACT

A method and apparatus in which a granular adsorbent, absorbent, chemisorptive, or catalytic material, particularly activated carbon is intermixed with (a) meltable polymer(s), and that the resulting mixture is heated under pressure and pressed into a molded piece (2). We propose to heat the mixture under pressure in a connecting part for a respirator or fan filter unit or in a connecting part (1) for an adapter for a respirator or fan filter unit, thereby positively and/or non-positively compacting it with said connecting part, and to make the connection between said connecting part (1) and said compacted mixture gastight.

19 Claims, 1 Drawing Sheet

METHOD AND APPARATUS FOR PRODUCING A RESPIRATORY FILTER

BACKGROUND OF THE INVENTION

1. Field of the Invention

This invention relates to a respiration filter made of a matrix-bonded filter medium, particularly of activated carbon and a method of producing such a filter.

2. Background Art

Such filters are known. Thus, U.S. Pat. No. 5,078,132 describes the manufacturing of a respirator in which the absorbent granules are combined with polymeric binder. This is done while pressing cylindrical and shell-shaped molded pieces. These molded pieces are then incorporated as filtration elements in a mask and are rigidly mounted to it.

A polymer-bonded granular adsorbent, absorbent, chemisorptive, or catalytic material and a method for producing molded pieces from it is known from DE 197 14 350 A1. A meltable polyethylene is intensely wetted with an oligocondensate in an appropriate mixing vessel, the fine-granular adsorbent, absorbent, chemisorptive, or catalytic material is added and the resulting mixture mixed intensely, then fed to a processing machine using a suitable conveying system and pressed into a molded piece inside a mold at temperatures in the range from 90° to 180° C., preferably 100° to 140° C., and pressures in the range of 0.0125 to 0.25 bar/cm$^2$, preferably 0.0225 to 0.0625 bar/cm$^2$, cooled in the mold and then removed from it. Using such molded pieces as filter elements for respiratory masks comprises a disadvantage in that their gastight fitting into inserts of respiratory masks or bonnets takes some process engineering effort. Furthermore, the mechanical stability of these molded pieces is limited along their edges.

SUMMARY OF THE INVENTION

It is an objective of this invention to condition a matrix-bonded filter medium such as matrix-bonded activated carbon for cost-effective and reliable use in respiratory equipment, particularly respiratory masks and bonnets.

The method according to the invention for producing a respiratory filter in which a granular adsorbent, absorbent, chemisorptive, or catalytic material, particularly activated carbon, is intermixed with (a) meltable polymer(s) that may have been wetted to retain homogeneities, and the resulting mixture is heated under pressure and pressed into a molded piece involves that said mixture is heated under pressure in a connecting part for a respirator or fan filter unit or a connecting part of an adapter for a respirator or fan filter unit and is thereby positively or non-positively pressed to it, and that the fit between said connecting part and the compacted mixture is gastight. Accordingly, the mold for the apparatus of the invention is a connecting part for a respirator, a fan filter, or an adapter for these.

The connecting part is preferably ring-shaped and comprises a complete or partial groove or tongue on its inner surface which the compacted mold piece engages in or partially encloses, respectively. The connecting part may also have an oval, rectangular, or other geometries. The connecting part comprises fasteners on its periphery for a detachable gastight connection to a respirator or fan filter unit or for gastight connection to an adapter for a respirator or fan filter unit. The adapter connection may also be designed as a detachable connection. The connecting part is preferably made of a polymer with a higher melting point than the polymer(s) of the molded piece, or of cardboard or metal.

DETAILED DESCRIPTION OF THE DRAWINGS

The FIGURE shows that the mold for a respiratory filter consists of a connecting part 1 in which a mixture of a granular adsorbent, absorbent, chemisorptive, or catalytic material, particularly activated carbon, and (a) meltable polymer(s) is heated under pressure and thus pressed into a molded piece 2. There is a positive and/or non-positive gastight connection between the connecting part 1 and the compacted molded piece 2.

The connecting part 1, which is ring-shaped here, has a circulatory tongue 5 extending a substantial length, or entirely, along its inner surface that is partially enclosed by the molded piece 2. This ensures a highly stable connection of connecting part 1/molded piece 2.

Figure 1:
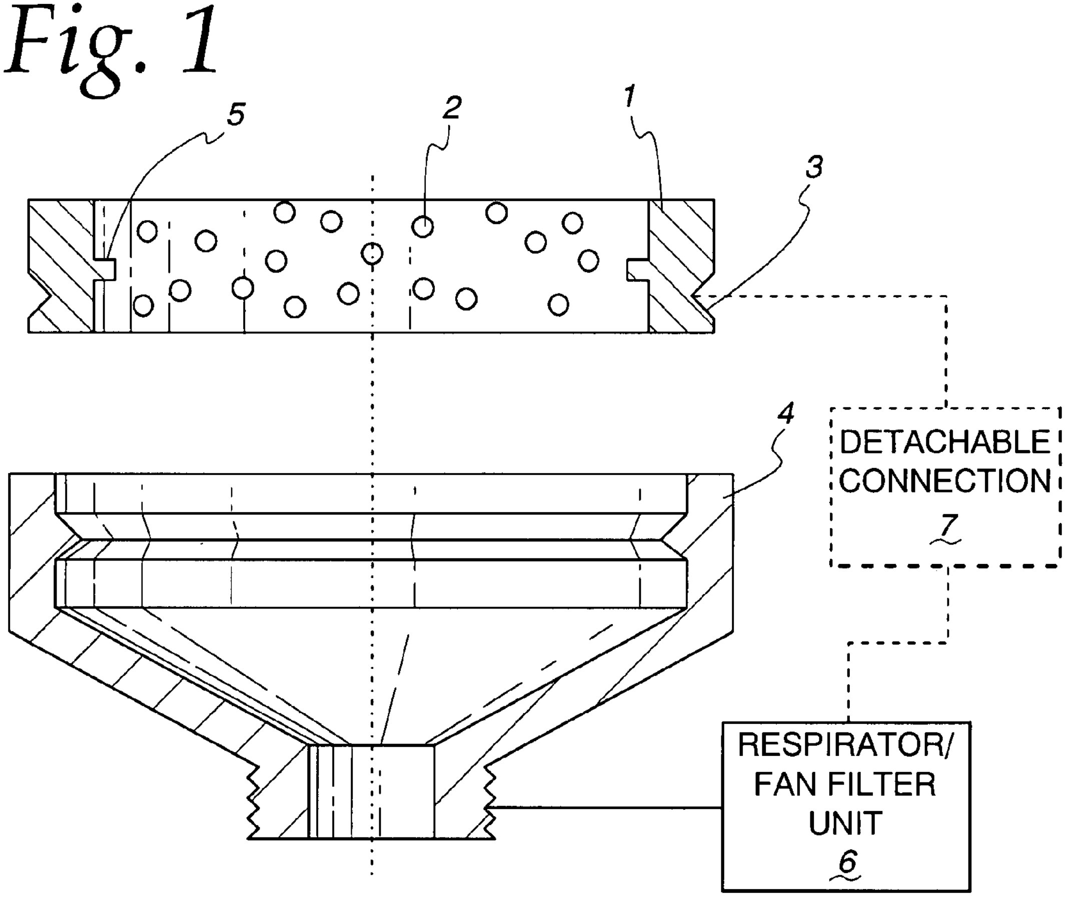
FIG. 1 is an exploded, cross-sectional view of a respiratory filter, according to the invention.
Figure 2:
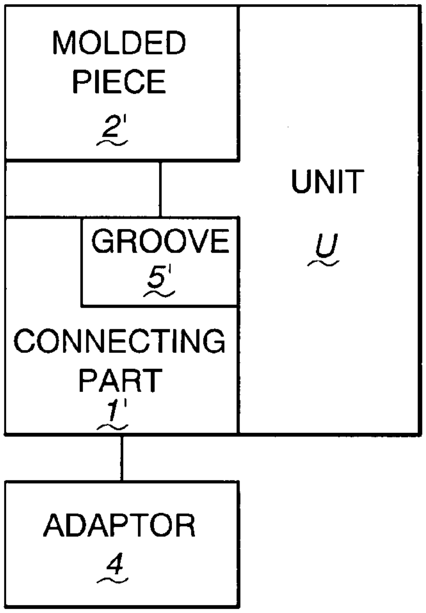
FIG. 2 is a schematic representation of a respiratory filter as in FIG. 1.

With this arrangement, gas moving in a generally straight path parallel to the central axis of the ring-shaped connecting part 1 and tending to move at the interface between the inner surface of the connecting part 1 and the molded piece 2 is intercepted, and diverted, by the tongue 5 towards the molded piece 2 to be filtered thereby. In the event a groove, as shown at 5' in FIG. 2, is formed on a connecting Dart 1' by reversing the cooperating components on the connecting part 1' and molded piece 2' the gas moving in this same path is caused to move through the material formed into the groove 5'. The molded piece 2' and connecting part 1', as the molded piece 2 and connecting piece 1, define a unit (U) that can be joined to the adapter 4 as previously described.

The molded piece 2 may be made using a polymer(s). The connecting part 1 may be made from a polymer having a higher melting point than the polymer(s) of the molded piece 2. The connecting part 1 might be made from another material, such as cardboard or metal.

The connecting part 1 comprises discrete fasteners 3 along its periphery for a detachable gastight connection to an adapter 4 for connecting a respirator or fan filter unit 5. The figure depicts this connection as a snap-in connection. It may also be designed as another conventional connection such as threaded, quarter-turn fastener, etc.

Instead of a connection to the adapter 4, a respirator or fan filter unit may also be connected using a direct detachable gastight connection 7.

Thus, the connecting part 1 has three functions: It holds the matrix-bonded activated carbon, it guides the air to be filtered through the matrix-bonded activated carbon, and it provides a detachable gastight connection to a respirator or fan filter unit or an adapter 4. The detachable connection facilitates safe and simple replacement of the respiratory filters.

We claim:

1. A method for producing a filter for a respirator or fan unit, said method comprising the steps of:

intermixing a granular adsorbent, absorbent, chemisorptive, or catalytic material, or activated carbon with a meltable polymer(s) to produce a mixture;

molding the mixture in a connecting part comprising an inner surface with a complete or partial a) groove into which the mixture is formed or b) a tongue with a substantial length against which the mixture is formed; and heating the mixture under pressure so as to make a molded piece that is adapted to work as a filter element for a respirator or fan unit and a substantially gastight connection between the molded piece and the inner surface of the connecting part at an interface so that the molded piece is formed so that it respectively engages in or at least partially encloses the groove or tongue and so that the molded piece and connecting part are stably connected to form a unit that can be operatively connected to a respirator or fan unit, the molded piece and connecting part constructed so that: i) in the event the inner surface has a groove, gas flowing in a straight line path through the interface is required to pass through the mixture at the groove; and b) in the event the inner surface has a tongue, gas flowing in a straight line path through the interface is intercepted by the tongue and diverted out of the straight line path and thereby required to pass through the mixture.

2. The method for producing a filter according to claim 1 further comprising the step of operatively connecting the filter to a respirator or fan unit.

3. The method for producing a filter according to claim 2 further comprising the step of providing an adapter and the step of operatively connecting the filter comprises operatively connecting the filter to the respirator or fan unit through the adapter, the adapter separate from and attachable to the filter to the respirator or fan unit.

4. The method for producing a filter according to claim 3 wherein the step of operatively connecting the filter comprises the step of snap-fitting the filter to the adapter.

5. The method for producing a filter according to claim 1 wherein the step of providing a connecting part comprises the step of providing a ring-shaped connecting part.

6. The method for producing a filter according to claim 5 wherein the groove or tongue extends continuously in a ring shape substantially completely around the inner surface whereby there is no straight line path a gas can follow fully through the filter at the interface without either: a) passing through the mixture at the groove: or b) being diverted by the tongue into the mixture.

7. The method for producing a filter according to claim 1 further comprising the steps of heating the mixture under pressure in the connecting part during the step of molding the mixture and thereafter connecting the connecting part to an adapter that is in turn releasably connected to a respirator or fan unit.

8. A filter for a respirator or fan unit, the filter comprising:

a mixture of granular adsorbent, absorbent, chemisorptive, or catalytic material, or activated carbon, heated under pressure in a connecting part with a meltable polymer(s) and pressed into a molded piece within the connecting part, wherein the molded piece is adapted to work as a filter element for the respirator or fan unit and there is a substantially gastight connection between said connecting part and the pressed molded piece at the interface, wherein the connecting part comprises an inner surface with a complete or partial groove or tongue with a substantial length which the pressed molded piece engages in, or at least partially encloses; respectively, so that the pressed molded piece and connecting part are stably connected to form a unit that can be operatively connected to a respirator or fan unit, the molded piece and connecting part constructed so that: i) in the event the inner surface has a groove, gas flowing in a straight line path through the interface is required to pass through the mixture at the groove: and b) in the event the inner surface has a tongue, gas flowing in a straight line path through the interface is intercepted by the tongue and diverted out of the straight line path and thereby required to pass through the mixture.

9. The filter according to claim 8 wherein the connecting part comprises a periphery with at least one discrete fastener on the periphery for a detachable substantially gastight connection to a respirator or fan unit.

10. The filter according to claim 9 wherein the connection to the respirator or fan unit is direct and detachable.

11. The filter according to claim 8 wherein the connecting part is made of a polymer with a higher melting point than the polymer(s) of the pressed molded piece, or of cardboard or metal.

12. The filter according to claim 8 in combination with a respirator or fan filter unit wherein the filter is operatively connected directly to the respirator or fan unit.

13. The filter according to claim 8 in combination with a respirator or fan unit wherein the filter is operatively connected to the respirator or fan unit through an adapter, the adapter separate from and attachable with the filter to the respirator or fan unit.

14. The filter according to claim 8 wherein the groove or tongue extends continuously substantially completely around the inner surface whereby there is no straight line path a gas car follow fully through the filter at the interface without either: a) passing through the mixture at the groove: or b) being diverted by the tongue into the mixture.

15. The respiratory filter according to claim 8 wherein the connecting part comprises a periphery with at least one fastener on the periphery for a substantially gastight connection to an adapter for connecting to a respirator or fan unit.

16. The filter according to claim 15 wherein the fasteners are designed for a snap-in or threaded connection.

17. The filter according to claim 15 in combination with an adapter that has a threaded portion to connect to a respirator or fan unit.

18. The filter according to claim 17 wherein the adapter surrounds the periphery of the connecting part.

19. The filter according to claim 18 wherein the periphery of the connecting part is snap-in or threadably connected to the adapter.

* * * * *